US008503736B2

(12) United States Patent
Muquit et al.

(10) Patent No.: US 8,503,736 B2
(45) Date of Patent: Aug. 6, 2013

(54) REGISTRATION DEVICE AND REGISTRATION METHOD FOR BIOMETRIC AUTHENTICATION, AUTHENTICATION DEVICE AND AUTHENTICATION METHOD FOR BIOMETRIC AUTHENTICATION

(75) Inventors: Mohammad Abdul Muquit, Tokyo (JP); Hiroshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 560 days.

(21) Appl. No.: 12/678,948

(22) PCT Filed: Sep. 24, 2008

(86) PCT No.: PCT/JP2008/067782
§ 371 (c)(1),
(2), (4) Date: Mar. 18, 2010

(87) PCT Pub. No.: WO2009/041704
PCT Pub. Date: Apr. 2, 2009

(65) Prior Publication Data
US 2010/0202665 A1 Aug. 12, 2010

(30) Foreign Application Priority Data
Sep. 28, 2007 (JP) .................................. 2007-254982

(51) Int. Cl.
*G06K 9/00* (2006.01)
(52) U.S. Cl.
USPC ........................................................ 382/115
(58) Field of Classification Search
USPC .................................. 382/115, 118, 124, 127
See application file for complete search history.

(56) References Cited

U.S. PATENT DOCUMENTS 6,301,375 B1 10/2001 Choi
6,621,917 B1 * 9/2003 Vilser ........................... 382/128
(Continued)

FOREIGN PATENT DOCUMENTS

| EP | 1804193 | 7/2007 |
|----|---------|--------|
| JP | 06-274602 | 9/1994 |

(Continued)

OTHER PUBLICATIONS

European Search Report for International Application No. PCT/JP2008/067782, mailing date Nov. 4, 2008.
European Search Report issued Apr. 26, 2012, in the Hague in EP08834407.

*Primary Examiner* — Edward Park
(74) *Attorney, Agent, or Firm* — Finnegan, Henderson, Farabow, Garrett & Dunner, L.L.P.

(57) ABSTRACT

A registering device, a registering method, an authentication device and an authentication method that can perform authentication with high speed while reducing an increase in the storage capacity are proposed. From a living-body image for authentication, a feature area included in the living-body image is detected. Further, a part having the same shape and the same size as those of the feature area is cut out from each of a plurality of living-body information items that are stored in a storage means based on position information associated with the living-body information item. A candidate for verification against the living-body image for authentication is selected from the plurality of living-body information items based on the resemblance between each of these cut-out parts and the feature area of the living-body image for authentication, and it is determined whether or not a registered person based on the result of verification of a living body indicated by a selected living-body information item against a living body shown in the living-body image for authentication.

13 Claims, 8 Drawing Sheets

U.S. PATENT DOCUMENTS

| | | | |
|---|---|---|---|
| 2003/0179915 A1* | 9/2003 | Goto | 382/128 |
| 2005/0117783 A1* | 6/2005 | Sung et al. | 382/118 |
| 2005/0180636 A1 | 8/2005 | Iizuka | |
| 2007/0036400 A1* | 2/2007 | Watanabe et al. | 382/124 |
| 2007/0127788 A1* | 6/2007 | Kakinuma et al. | 382/118 |
| 2008/0101674 A1* | 5/2008 | Begelman et al. | 382/130 |

FOREIGN PATENT DOCUMENTS

| | | |
|---|---|---|
| JP | 2003-030661 | 1/2003 |
| JP | 2005-215883 | 8/2005 |

* cited by examiner

FIG. 6

| REGISTRATION ID | X COORDINATE AT THE CENTER OF BLOCK | Y COORDINATE AT THE CENTER OF BLOCK |
|---|---|---|
| 1 | x1 | y1 |
| 2 | x2 | y2 |
| 3 | x3 | y3 |
| ⋮ | ⋮ | ⋮ |
| N-1 | $x_{n-1}$ | $y_{n-1}$ |
| N | $x_N$ | $y_N$ |

AR1　AR2　AR3

(A)  (B)

REGISTRATION DEVICE AND
REGISTRATION METHOD FOR BIOMETRIC
AUTHENTICATION, AUTHENTICATION
DEVICE AND AUTHENTICATION METHOD
FOR BIOMETRIC AUTHENTICATION

TECHNICAL FIELD

The present invention relates to a registering device, a registering method, an authentication device and an authentication method, and is suitable for biometrics authentication, for example.

BACKGROUND ART

In the past, registration information items of a plurality of persons have often been registered with a memory and searches have often been made to determine whether or not a person who input information which agrees with the registered registration information item is a registered person, as is the case with a system managing the entry and leaving a predetermined place, for example. In that case, so-called "1:N authentication" is made to verify information-for-authentication for inputting against each of the registration information items registered with the memory.

A device configured to generate a low-resolution transformation registered image and a transformation verification image based on a plurality of registered images and a verification image for authentication, and determine whether or not a registered image which becomes the generation source of an upper prescribed number of transformation registered images showing strong correlations with the transformation verification image is a registered person based on the result of verification against the verification image for authentication has been proposed as an authentication device of that type (refer to Patent Document 1, for example).

Patent Document 1: Japanese Unexamined Patent Application Publication No. 2005-215883

Incidentally, in the authentication device having that configuration, the low-resolution transformation registered image and the transformation verification image are generated each time the verification image for authentication is input (each time the authentication processing is started). Therefore, the authentication processing speed is decreased by as much as the generation.

As an exemplary solution to the problem, it can be considered that the low-resolution transformation registered image is generated each time each of the registered images is registered, and the particular transformation registered image is associated with the registered image and registered with a memory. However, according to the example, a problem of a significantly increased storage capacity arises.

DISCLOSURE OF INVENTION

The present invention has been achieved in consideration of the above-described points, so as to propose a registering device, a registering method, an authentication device and an authentication method that can perform authentication with high speed while reducing an increase in the storage capacity.

For solving the above-described problems, the present invention provides a registering device including an acquisition unit that acquires a living-body image, a detecting unit that detects a feature area used in an authentication process from the living-body image, and a registering unit that associates position information indicating a position of part of the feature area with respect to a reference with living-body information relating to a living body shown in the living-body image and that registers the position information and the living-body information with a storage means.

Further, the present invention provides a registering method including a first step provided to acquire a living-body image, a second step provided to detect a feature area provided to be used in an authentication process from the living-body image, and a third step provided to associate position information indicating a position of the feature area with respect to a reference with living-body information indicating a living body shown in the living-body image and register the position information and the living-body information with a storage means.

Further, the present invention provides an authentication device including an acquisition unit that acquires a living-body image for authentication, a detecting unit that detects a feature area from the living-body image for authentication, a selecting unit that cuts out an area which becomes the feature area or more from each of a plurality of living-body information items registered with a storage means based on position information associated with the living-body information item and that selects a candidate for verification against the living-body image for authentication from the plurality of living-body information items based on a resemblance between each of the cut-out areas and the feature area, and a determining unit that determines whether or not a registered person based on a result of verification of a living body indicated by a living-body information item selected by the selecting unit against a living body shown in the living-body image.

Further, the present invention provides an authentication method including a first step of acquiring a living-body image for authentication, a second step of detecting a feature area from the living-body image for authentication, a third step of cutting out an area which becomes the feature area or more from each of a plurality of living-body information items registered with a storage means based on position information associated with the living-body information item, a fourth step of selecting a candidate for verification against the living-body image for authentication from the plurality of living-body information items based on a resemblance between each of the cut-out areas and the feature area, and a fifth step of determining whether or not a registered person based on a result of verification of a living body indicated by a selected living-body information item against a living body shown in the living-body image.

Thus, the present invention allows for omitting the detection of the feature area provided in the living-body image for registration in the authentication process, and performing the authentication process with speed increased by as much as the omission. Further, the feature area itself provided to be used in the authentication process is not registered with the storage means, but information indicating the position of a part of the feature area is registered. Therefore, the storage capacity for the storage means can be decreased. Thus, the registering device, the registering method, the authentication device, and the authentication method that can perform authentication with high speed while reducing an increase in the storage capacity can be achieved.

BRIEF DESCRIPTION OF DRAWINGS

FIG. 6 is an outlined line drawing showing the data configuration of feature position information.

BEST MODES FOR CARRYING OUT THE INVENTION

Hereinafter, an embodiment of the present invention will be described with reference to drawings.

(1) Entire Configuration of Authentication Device

Figure 1:
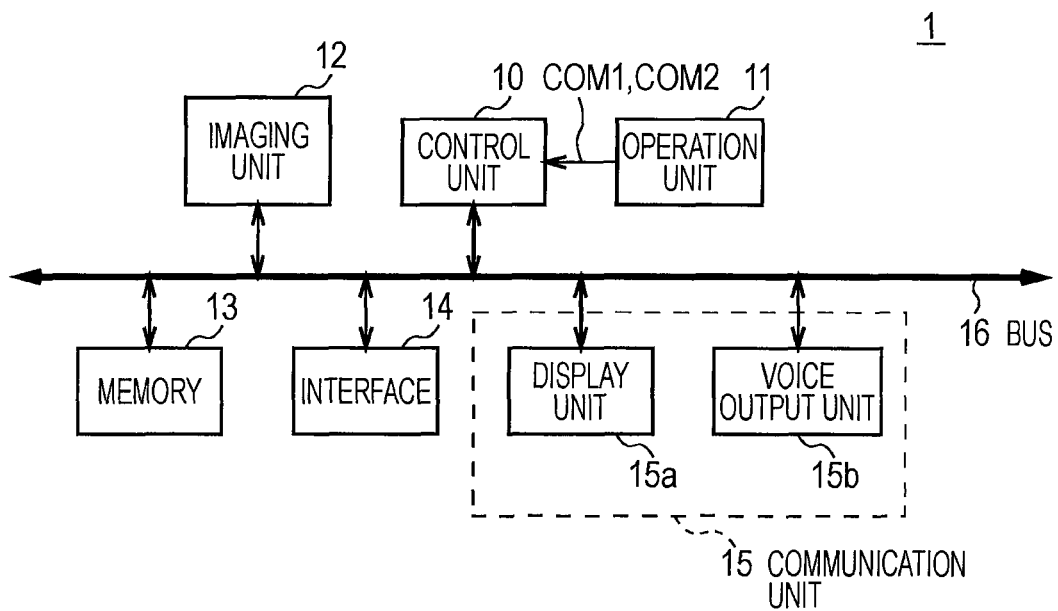
FIG. 1 is an outlined line drawing showing the circuit configuration of an authentication device according to the above-described embodiment.

FIG. 1 shows the entire configuration of an authentication device 1 according to the above-described embodiment. Each of an instruction input unit 11, an imaging unit 12, a memory 13, an interface 14 and a notification unit 15 is connected to a control unit 10 via a bus 16 so that the authentication device 1 is configured.

The control unit 10 is configured as a computer including a CPU (Central Processing Unit) controlling the entire authentication device 1, a ROM (Read Only Memory) storing various types of programs, setting information, and so forth, and a RAM (Random Access Memory) provided as the work memory of the CPU.

An instruction to execute mode of registering a vein (the mode is hereinafter referred to as vein registration mode) of a user for registration (the user is hereinafter referred to as a registered person) and/or an instruction to execute mode of determining the presence or absence of the registered person himself (the mode is hereinafter referred to as authentication mode) is input from the instruction input unit 11 to the control unit 10.

The control unit 10 is configured to determine mode for execution based on the execution instructions, control the imaging unit 12, the memory 13, the interface 14 and the notification unit 15 as appropriate based on the program corresponding to a result of the determination, and execute the vein registration mode and/or the authentication mode.

The imaging unit 12 applies light with a wavelength included in a wavelength range (700 [nm]~900 [nm]) having the property of being specifically absorbed into both deoxyhemoglobin and oxyhemoglobin (the light is hereinafter referred to as near-infrared light) onto a plane on which a finger should be placed (the face is hereinafter referred to as a finger placement plane).

Further, the imaging unit 12 is configured to generate an image of a vein inside a living body portion (the image is hereinafter referred to as a vein image) as data (the data is hereinafter referred to as vein image data) and transmit the vein image data to the control unit 10.

The memory 13 is provided to store information about a vein shown on the vein image (the information is hereinafter referred to as vein information), and configured to store the vein information in a predetermined area specified by the control unit 10 and/or read the vein information from the predetermined area.

The interface 14 is configured to deliver and receive various types of data between and a device outside the authentication device 1 via a predetermined transfer path.

The notification unit 15 includes a display unit 15a and a voice output unit 15b, and the display unit 15a displays a character and/or a drawing generated based on display data supplied from the control unit 10 on a display screen. On the other hand, the voice output unit 15b is configured to output a voice generated based on voice data supplied from the control unit 10 from a speaker.

(1-1) Vein Registration Mode

Figure 2:
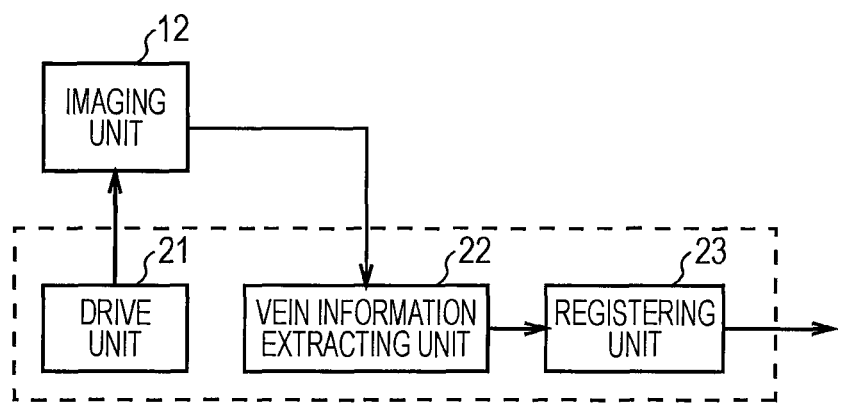
FIG. 2 is a block diagram showing the functional configuration of a control unit in vein registration mode.

Next, the vein registration mode will be described. When the vein registration mode is determined to be mode for execution, the control unit 10 makes a notification that a finger should be placed on the finger placement plane through the notification unit 15. After that, the control unit 10 functions as a drive unit 21, a vein extracting unit 22, and a registration processing unit 23, as shown in FIG. 2.

In that case, the drive unit 21 is configured to drive and control the imaging unit 12. Namely, the drive unit 21 applies the near-infrared light to the finger placement plane by driving a light source provided in the imaging unit 12. Further, the drive unit 21 adjusts the lens position of an optical lens provided in the imaging unit 12 so that a subject is brought into focus. Still further, the drive unit 21 adjusts the aperture value of an aperture provided in the imaging unit 12 based on a predetermined exposure value (EV (Exposure Value)) and adjusts a shutter speed (exposure time) for an imaging device.

The vein extracting unit 22 extracts a vein from a vein image of vein image data which is supplied from the imaging unit 12 as a result of the imaging performed in the imaging unit 12, the vein being shown in the vein image.

An example of the extraction method will be described. The vein extracting unit 22 performs preprocessing including image rotation correction, noise removal, image cutting-out, and so forth for the vein image data as appropriate. After that, the vein extracting unit 22 performs sharpening processing for the vein image data by using a differential filter including, for example, a Gaussian filter, a Log filter, and so forth. Further, the vein extracting unit 22 is configured to binarize a vein image that had been subjected to the sharpening processing so that the vein width is expressed as a constant fine line with reference to the center of a vein shown in the binarized vein image and/or the brightness peak.

Therefore, a vein with a constant line width is extracted from a multi-valued vein image as a binary image (the image is hereinafter referred to as a vein image) through the vein extracting unit 22 according to the above-described embodiment.

The registration processing unit 23 detects a feature area from the vein image extracted through the vein extracting unit 22, and stores information indicating the position of part of the feature area for the vein image (hereinafter the information is referred to as feature position information) and the vein image in the memory 13 while associating them with each other so that the feature position information and the vein image are registered.

Thus, the control unit 10 is configured to be able to execute the vein registration mode.

(1-2) Authentication Mode

Figure 3:
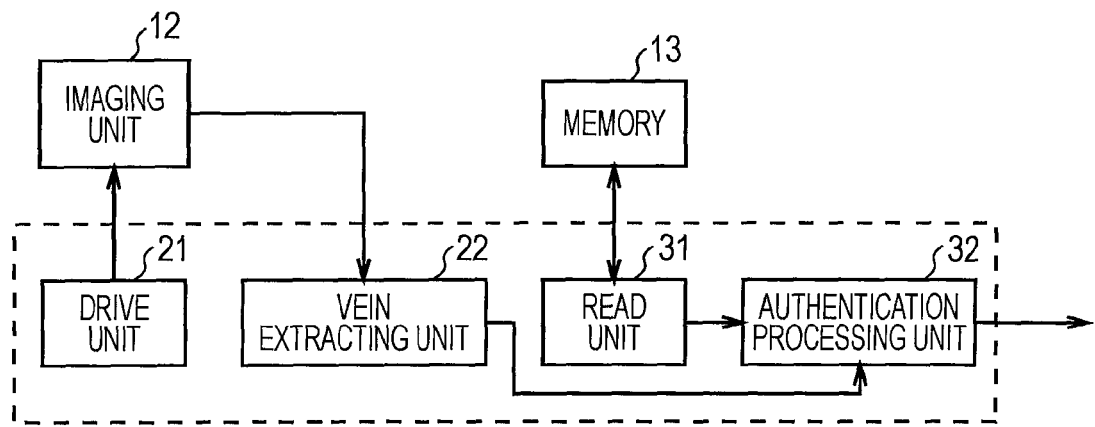
FIG. 3 is a block diagram showing the functional configuration of the control unit in authentication mode.

Next, authentication mode will be described. When the authentication mode is determined to be mode for execution, the control unit 10 makes a notification that a finger should be placed on the finger placement plane through the notification unit 15. After that, the control unit 10 functions as the drive unit 21, the vein extracting unit 22, a read unit 31 and an authentication processing unit 32, as shown in FIG. 3 in which the components corresponding to those of FIG. 2 are designated by the same reference numerals.

In that case, the drive unit 21 drives the imaging unit 12, and the vein extracting unit 22 extracts the vein image from the vein image data supplied from the imaging unit 12.

The read unit 31 reads the vein image and the feature information that are registered with the memory 13, and supplies the read vein image and feature position information to the authentication processing unit 32.

When a single vein image is registered with the memory 13, the authentication processing unit 32 verifies the registered single vein image against a vein image for authentication, the vein image being extracted through the vein extracting unit 22, and determines whether or not a registered person based on the verification result.

On the other hand, when a plurality of vein images is registered with the memory 13, the authentication processing unit 32 cuts out a feature area from the above-described vein images based on feature position information associated with the vein images, and cuts out a feature area from the vein image for authentication, the vein image being extracted through the vein extracting unit 22.

Further, the authentication processing unit 32 selects a candidate for verification against the vein image for authentication from the plurality of vein images based on the resemblance between the feature area specified in each of the registered vein images and the feature area specified in the vein image for authentication. Then, the authentication processing unit 32 verifies the selected vein image against the vein image for authentication, and determines whether or not the registered person based on the verification result.

Here, if the authentication processing unit 32 determines that it is impossible to acknowledge as the registered person, the authentication processing unit 32 visually and aurally notifies that it is impossible to acknowledge as the registered person, for example, through the display unit 15a and the voice output unit 15b as processing for authentication failure.

On the other hand, when it is determined that the image can be acknowledged as the registered person, the authentication processing unit 32 transmits data used to perform processing for an authentication success from the interface 14 to a device outside the authentication device 1. In the device, predetermined processing such as unlocking an unlocked door only for a predetermined period of time is performed, for example, as the processing for the authentication success.

Thus, the control unit 10 is configured to be capable of executing the authentication mode.

(2) Configuration of Registration Processing Unit

Figure 4:
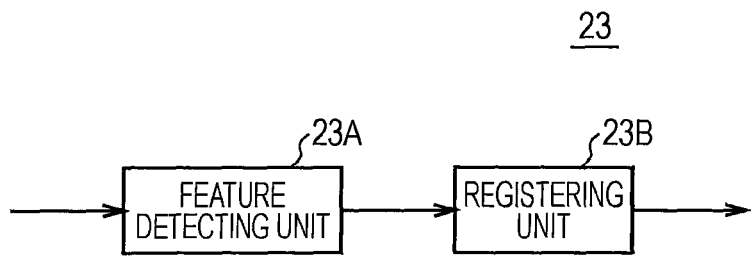
FIG. 4 is a block diagram showing the configuration of a registration processing unit.

Next, the configuration of the registration processing unit 23 shown in FIG. 2 will be described. The registration processing unit 23 includes a feature detecting unit 23A and a registering unit 23B, as shown in FIG. 4.

Upon receiving the vein image transmitted from the vein extracting unit 22 (FIG. 2), the feature detecting unit 23A divides the vein image into a plurality of search blocks sharing a common element in part.

Figure 5:
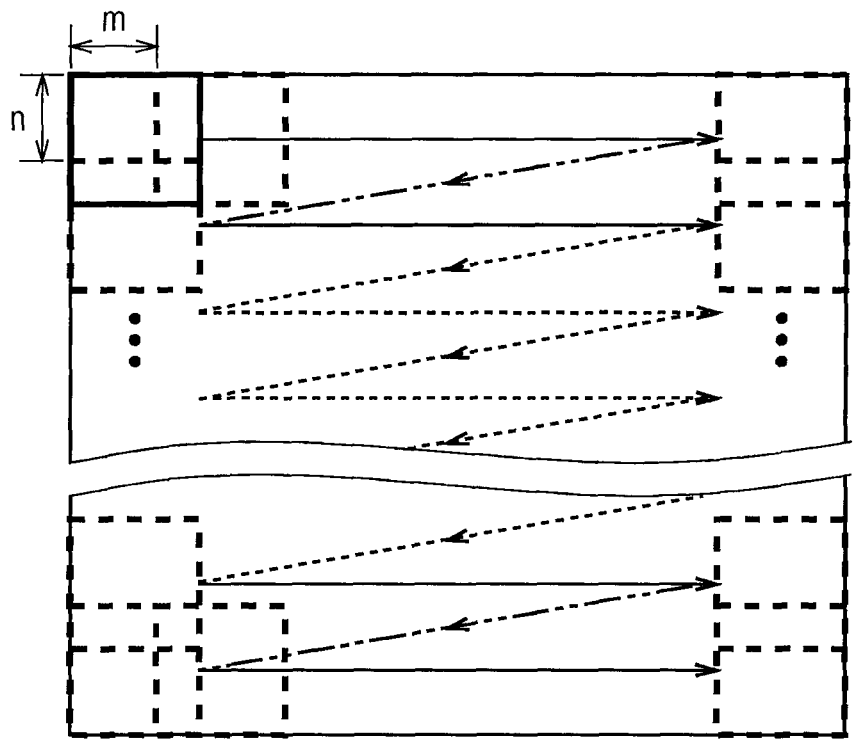
FIG. 5 is an outlined line drawing used to describe the setting of a search block.

An example of the dividing method will be described. As shown in FIG. 5, the feature detecting unit 23A determines a displacement width in a horizontal direction to be m pixels and determines a displacement width in a vertical direction to be n pixels, and sets the search blocks in order of raster scanning so that the division is achieved.

Further, when the vein image is divided into the plurality of search blocks, the feature detecting unit 23A detects a single search block which becomes the feature area of a vein (the block is hereinafter referred to as a feature block) from among the search blocks.

An example of the detection method will be described. When the entire vein amount of the vein image is determined to be $T_{VQ}$, the total number of diverging points shown in the vein image is determined to be $T_{JP}$, the vein amount of the search block is determined to be $B_{VQ}$, the number of diverging points shown in the search block is determined to be $B_{JP}$, and the feature amount of the search block is determined to be S, the feature amount S of the search block is shown as the following equation.

$$S = B_{VQ}/T_{VQ} + B_{JP}/T_{JP} \quad (1)$$

The feature detecting unit 23A calculates the sum of the vein amount attained in the search block in reference to the entire vein amount and the diverging point number attained in the search block in reference to the total diverging point number according to the equation (1), as the feature amount attained in the search block, and detects a single search block corresponding to the largest sum as the feature block.

Thus, the feature detecting unit 23A is configured to divide the vein image into the plurality of search blocks and detect the feature block based on the vein amounts and the diverging point numbers that are attained in those search blocks.

The registering unit 23B generates feature position information indicating the position of the center of the feature block with reference to the vein image, and registers the feature position information and the vein image with the memory 13 while associating them with each other.

Here, the data structure of the feature position information is shown in FIG. 6. As shown in FIG. 6, the feature position information includes an area AR1 provided to store a registration ID issued by the registering unit 23B, an area AR2 provided to store the value of an x coordinate shown at the center of the feature block detected through the feature detecting unit 23A, and an area AR3 provided to store the value of a Y coordinate shown at the center of the feature block, and an entry of the feature position information is made in the order in which the feature blocks are detected. Further, the vein image corresponding to the feature position information of which entry had been made is associated through a registration ID and registered.

(3) Configuration of Authentication Processing Unit

Figure 7:
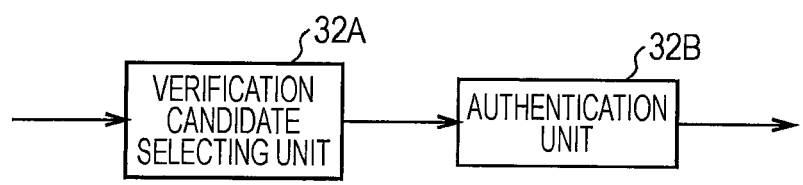
FIG. 7 is a block diagram showing the configuration of an authentication processing unit.

Next, the configuration of the authentication processing unit 32 shown in FIG. 3 will be described. The authentication processing unit 32 includes a verification candidate selecting unit 32A and an authentication unit 32B as shown in FIG. 7.

A single feature position information item and a single vein image and/or a plurality of feature position information items and a plurality of vein images are supplied from the read unit 31 (FIG. 3) to the verification candidate selecting unit 32A.

Figure 8:
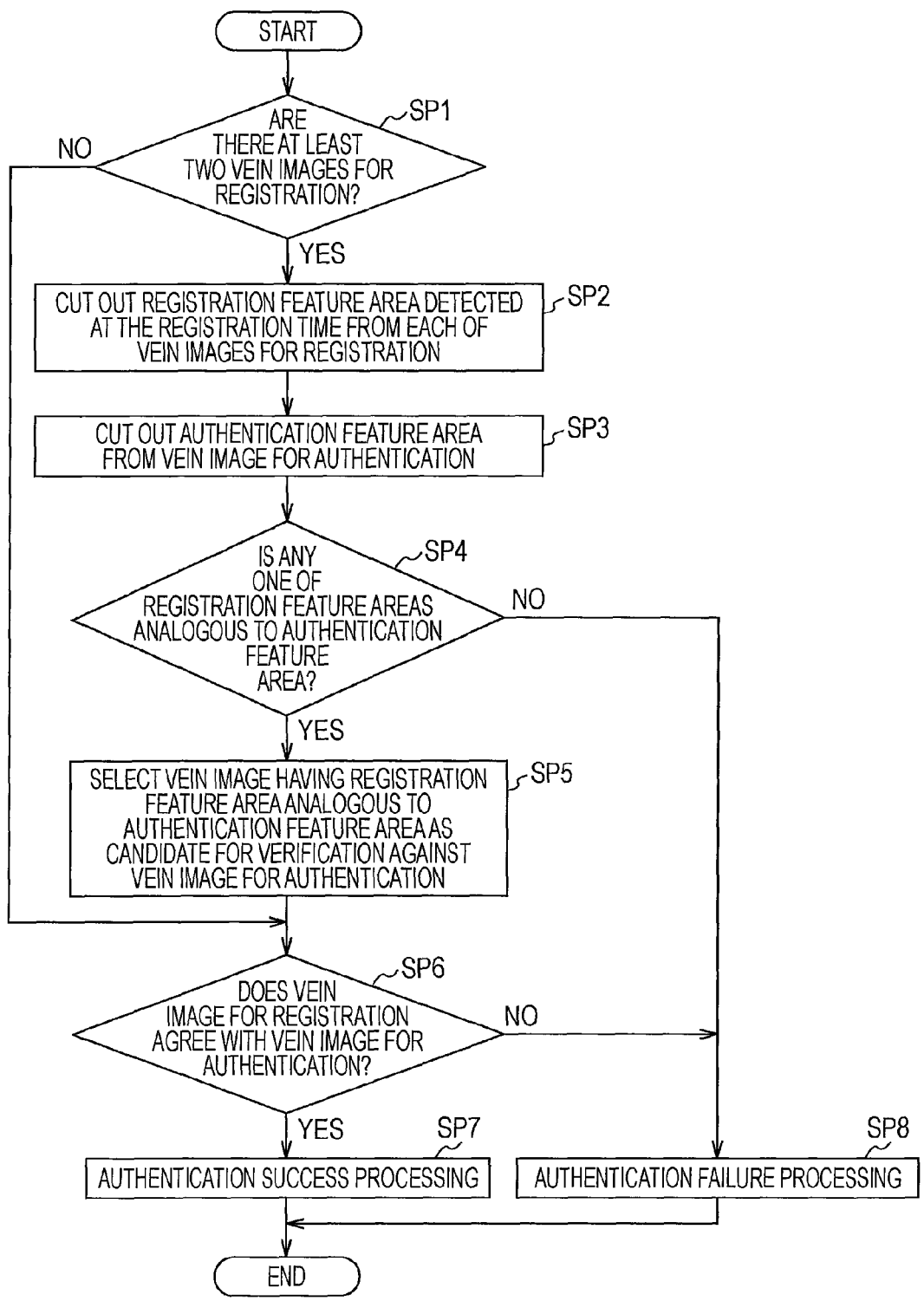
FIG. 8 is a flowchart showing the steps of authentication processing.

Upon receiving the plurality of feature position information items and vein images (FIG. 8: step SP1 (YES)), the verification candidate selecting unit 32A cuts out feature areas detected through the feature detecting unit 23A (FIG. 4) at the registration time (the areas are hereinafter referred to as registration feature areas) from the respective vein images (FIG. 8: step SP2). Incidentally, FIG. 9(A) only shows a single vein image and a single cut-out image for the sake of convenience.

Specifically, the verification candidate selecting unit 32A identifies the center position of the registration feature area shown in the registered vein image based on the feature position information associated with the vein image, and cuts out a part having the same shape and size as those of a search block set through the feature detecting unit 23A with reference to the identified position as the center. Incidentally, even though the part for cutting-out has the same shape and size as those of the search block in the above-described embodiment, the part may be larger than the search block.

Figure 9:
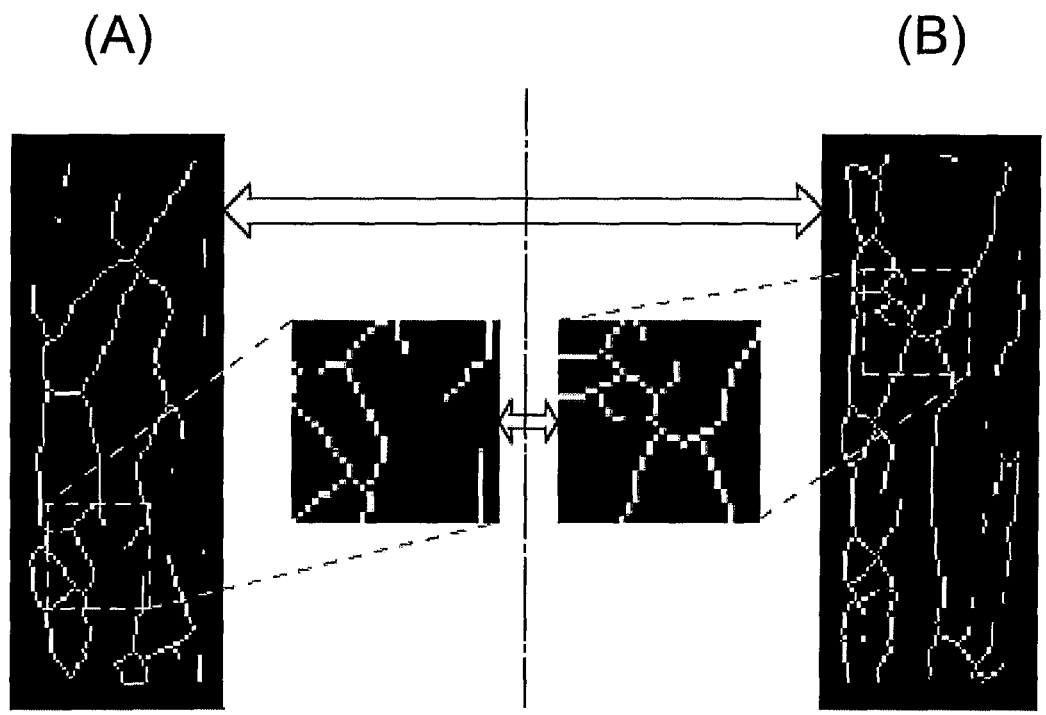
FIG. 9 is a photograph of an image used to describe the cutting-out of a feature area.

Next, as shown in FIG. 9(B), the verification candidate selecting unit 32A cuts out an authentication feature area from a vein image for authentication (FIG. 8: step SP3), the vein image being extracted through the vein extracting unit 22 (FIG. 3), as is the case with the feature detecting unit 23A (FIG. 4).

Figure 10:
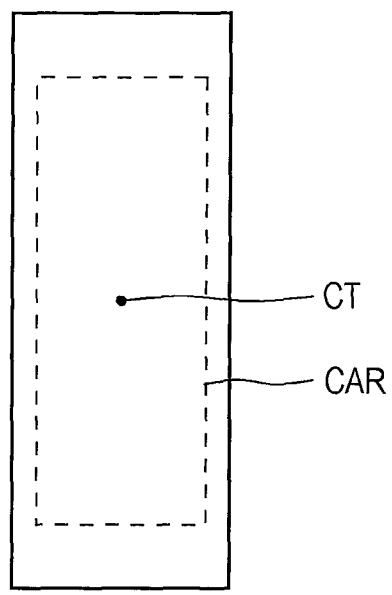
FIG. 10 is an outlined line drawing used to describe the setting of a range defined to detect the feature area.

Specifically, the verification candidate selecting unit 32A acquires the vein image for authentication and sets an area CAR defined to detect a feature area with reference to the center of the vein image for authentication as shown in FIG. 10.

Then, the verification candidate selecting unit 32A divides the area CAR into a plurality of search blocks having the same shape and size with those of the search block set through the feature detecting unit 23A (FIG. 4), calculates the feature amount attained in each of the search blocks according to the same calculating method as that used by the feature detecting unit 23A, and cuts out a single search block having the largest feature amount as the authentication feature area in the same way as that described in FIG. 5.

Next, the verification candidate selecting unit 32A determines whether or not an area analogous to the authentication feature area is included in each of the registration feature areas based on the resemblance between the particular feature areas (FIG. 8: step SP4). The resemblance may be, for example, a cross-correlation value obtained based on a cross-correlation function, a phase correlation value obtained based on a phase correlation function and/or the sum of absolute values of unit blocks obtained based on a SAD (Sum of Absolute difference), and so forth.

Here, when there is a single registration feature area and/or at least two registration feature areas, where the resemblance between the registration feature area and the authentication feature area is equal to or larger than a threshold value (FIG. 8: step SP4 (YES)), it means that there is a high probability that a vein image which becomes the cutting-out source of the registration feature area agrees with a vein image which becomes the cutting-out source of the authentication feature area, namely, there is a high probability that a person for authentication is a registered person.

In that case, the verification candidate selecting unit 23A selects the vein image which becomes the cutting-out source of the registration feature area, where the resemblance between the vein image and the authentication feature area is equal to or higher than the threshold value, as a candidate for verification against a vein image for authentication (FIG. 8: step SP5), and transmits the selected vein image to the authentication unit 32B (FIG. 7).

On the contrary, when there is no registration feature area, where the resemblance between the registration feature area and the authentication feature area is equal to or higher than the threshold value, (FIG. 8: step SP4 (NO)), it means that there is no probability that the person for authentication is a registered person.

In that case, the verification candidate selecting unit 32A stops the authentication processing performed by the authentication unit 32B, and visually and aurally notifies that is not acknowledged as the registered person through the display unit 15a and the voice output unit 15b (FIG. 8: step SP8).

Thus, when a plurality of vein images is registered with the memory 13 (FIG. 8: step SP1 (YES)), the verification candidate selecting unit 32A selects a vein image having a part analogous to a characteristic part of the vein image for authentication from among those vein images as a candidate for verification against the particular vein image for authentication (FIG. 8: step SP2 step SP5).

On the other hand, upon receiving a single feature position information item and a single vein image (FIG. 8: step SP1 (NO)) that are transmitted from the read unit 31 (FIG. 3), the verification candidate selecting unit 32A transmits the single vein image to the authentication unit 32B (FIG. 7) without selecting the candidate that should be verified against the vein image for authentication.

The authentication unit 32B determines whether or not the single vein image registered with the memory 13 and/or the at least one vein image selected through the verification candidate selecting unit 32A agrees with the vein image for authentication, the vein image being supplied from the vein extracting unit 22 (FIG. 3) based on the resemblance between the particular vein images (FIG. 8: step SP6).

Here, when obtaining the resemblance between at least two vein images and the vein image for authentication, the authentication unit 32B acquires the resemblance between registration feature areas shown in the at least two vein images and an authentication feature area shown in the vein image for authentication from the verification candidate selecting unit 32A, and obtains the resemblances between the vein image for authentication and the vein images with registration feature areas in descending order of resemblance between the authentication feature area and the registration feature area.

Incidentally, the resemblance between the vein images may be obtained according to the same method as that used for the resemblance between feature areas, or a different method.

Here, when the resemblance between the vein images is lower than the limit (threshold value) of acknowledging the image as a registered person, the authentication unit 32B determines that the vein images do not agree with each other (FIG. 8: step SP6 (NO)), and executes the processing for authentication failure (FIG. 8: step SP8). On the contrary, when the resemblance between the vein images is equal to or higher than the limit of acknowledging as the registered person, the authentication unit 32B determines that the vein images agree with each other (FIG. 8: step SP6 (YES)), and executes the processing for authentication success (FIG. 8: step SP7).

Thus, the authentication processing unit 32 is configured to execute the authentication processing.

(4) Advantages and Others

According to the above-described configuration, in the vein registration mode, the authentication device 1 acquires a vein image for registration from the finger of a registered person, detects the feature area of a vein, the feature area being defined to be used in the process of authentication, and registers information indicating the position of a part of the feature area (feature position information) and the vein image with the memory 13 while associating them with each other.

Therefore, the vein registration mode allows for omitting the detection of the registration feature area in the authentication process and increasing the speed of performing the authentication process by as much as the omission. Further, the feature area itself of the vein, the feature area being provided to be used in the authentication process, is not registered with the memory 13, but information indicating the position of a part of the particular feature area (feature position information) is registered. Therefore, the storage capacity of the memory 13 can be decreased.

It has been said that a vein does not change throughout a lifetime and the vein cannot be replaced upon being stolen unlike a password or the like. Therefore, the memory 13 with tamper resistance is often used. Since it is technically and economically impossible to easily increase the capacity of the memory 13 with the tamper resistance, the memory 13 with the tamper resistance is particularly useful when the memory 13 is used.

Further, in the authentication device 1, the position of the center of a feature area is adopted as the feature position information. In the authentication device 1, therefore, the amount of occupation of the feature position information for the memory 13 can be minimized so that the storage capacity of the memory 13 can further be decreased.

On the other hand, the authentication device 1 acquires a vein image for authentication from the finger of a registered person and detects a feature area of a vein included in the vein image (authentication feature area) in the authentication mode. Further, the authentication device 1 cuts out a part having the same shape and size as those of the authentication feature area (registration feature area) from each of the plurality of vein images registered with the memory 13 based on the feature position information associated with the vein image, and selects a candidate for verification against the vein image for authentication from the registered vein images based on the resemblance between the cut-out registration feature areas and the authentication feature area. In that state, the authentication device 1 determines whether or not a registered person based on the result of verification of the selected vein image against the vein image for authentication.

In the authentication mode, therefore, it is essential only that the registration feature area is cut out based on the feature position information without detecting the registration feature area, which makes it possible to determine whether or not the registered person with speed increased by as much as the detection. Further, since a feature area (registration feature area, authentication feature area) of part of an original image (vein image) is targeted, the verification candidate can be selected with precision higher than in the case where part of an original image (vein image) obtained by thinning out pixels, as is the case with a thumbnail image, is targeted. As a result, processing performed until it is determined that the registered person can be performed with high speed.

Incidentally, when the size of the original image (vein image) is determined to be 320×240 pixels and the size of the feature area is determined to be 40×40 pixels, the feature area becomes one-forty-eighth of the original image (vein image). Therefore, when the resemblance is calculated based on the SAD, the time of calculating the resemblance between the registration feature area and the authentication feature area is increased by a factor of 1/48 with reference to the time of calculating the resemblance between a vein image for registration and a vein image for authentication. Further, when the resemblance is calculated based on cross-correlation, the time of calculating the resemblance between the registration feature area and the authentication feature area is increased by a factor of 1/2304 with reference to the time of calculating the resemblance between the vein image for registration and the vein image for authentication, which also shows that it becomes possible to perform the processing executed until determined to be the registered person with high speed in the authentication mode.

Further, when detecting the feature area (the registration feature area, the authentication feature area), the authentication device 1 divides a vein image into a plurality of search blocks, and detects a feature block from each of the divided search blocks based on the number of pixels and the number of diverging points of a vein constituting the search block.

Consequently, in the authentication device 1, the feature area is detected based on not only the amount of a vein shown in the search block but also the shape of the vein, so that the feature area of the vein can be detected with precision higher than in the case where the feature area is detected based only on the vein amount.

Specifically, in the above-described embodiment, the authentication device 1 is configured to detect a feature block based on the sum of the number of pixels of a vein constituting a search block in reference to the total number of pixels of a vein constituting the entire vein image and the number of diverging points of a vein constituting a block in reference to the total number of diverging points of the vein constituting the entire vein image.

Consequently, in the authentication device 1, the number of pixels and the number of diverging points of the vein constituting the search block are normalized to attain a constant scale so that the feature area of the vein can be detected with precision higher than in the case where the normalization is not attained. Further, the sum of the number of pixels of the vein and the number of the diverging points of the vein is determined to be the parameter for detecting the feature block so that the data calculation can be performed with speed higher than in the case where the number of pixels of the vein is multiplied by the number of diverging points of the vein.

When a vein image is divided into a plurality of the search blocks, the authentication device 1 divides the vein image into a plurality of blocks sharing a common element in part (FIG. 5). In the authentication device 1, therefore, the vein image can be fractionated more than in the case where the vein image is divided into a plurality of blocks sharing no common element, which makes it possible to detect the feature area of the vein with precision.

According to the above-described configuration, a vein image for registration is acquired from the finger of a registered person and the feature area of a vein, the feature area defined to be used in the authentication process, is detected, and information indicating the position of part of the feature area (feature position information) and the vein image are registered with the memory 13 in association with each other. Consequently, it becomes possible to achieve the authentication device 1 that can perform authentication with high speed while reducing an increase in the storage capacity.

(5) Other Embodiments

In the above-described embodiment, the example where a vein image is used as a living-body image has been discussed. Without being limited to the embodiment, for example, a fingerprint image, an iris image, a mouthprint image and/or a nerve image may be used for the present invention. The living-body image may be multi-valued, or binary.

Here, in the above-described embodiment, an acquisition unit configured to acquire a living-body image includes the imaging unit 12, the drive unit 21, and the vein extracting unit 22. However, the configuration mode can be changed as necessary in view of the circumstances such as the type of a living body for application by omitting and/or replacing the particular imaging unit 1, drive unit 21 and/or vein extracting unit 22 and/or adding a new processing unit, for example. The same can be said for the details of processing performed by each of the units.

Further, even though the vein image is divided into the plurality of search blocks sharing the common element in part (FIG. 5) in the above-described embodiment, the present invention may be achieved by dividing the vein image into a plurality of search blocks sharing no common element without being limited to the embodiment. Further, even though the center area CAR (FIG. 10) of a vein image for authentication is divided into the plurality of search blocks in the authentication mode, the entire vein image for authentication may be divided into a plurality of the search blocks as is the case with the vein registration mode.

Further, in the above-described embodiment, the case where the vein image is registered has been discussed. However, without being limited to the embodiment, the present invention may be achieved by registering, for example, part of a vein shown in the vein image and/or a parameter curve-approximating the vein. It is essential only that any vein information relating to a vein can be adopted as the object to be registered. Further, the same can be said for the case where a living-body image other than the vein image is used.

Further, in the above-described embodiment, the case where the feature area of a vein is detected based on the amount of a vein constituting a block (the number of pixels of the vein) and the number of diverging points has been discussed. However, without being limited to the embodiment, the present invention may be achieved by detecting the feature area of the vein based only on the amount of the vein constituting the block.

Further, a method of detecting a single search block having the largest sum and/or the largest multiplied value of the amount of the vein constituting the block and the result of assigning weights to the number of the diverging points of the vein constituting the block, and/or a method of detecting a single search block having the largest value obtained by acquiring the number of diverging points shown in the search block in reference to the total diverging point number as a weight coefficient for the amount of a vein shown in the search block in reference to the entire vein amount may be adopted. In that case, the feature area is detected while placing importance on the shape so that the feature area of the vein can be detected with substantially increased precision.

Although the above-described examples are not applied, it is essential only that at least the amount of a vein constituting a block is used. Further, the same can be said in the case where a living-body image other than the vein image is used.

Further, in the above-described embodiment, if the vein image has a registration feature area, where the resemblance between the authentication feature area and the registration feature area is equal to or higher than the threshold value, the number of selections made to select candidates for verification against the vein image for authentication is unlimited. However, without being limited to the embodiment, the number of candidates for selection may be limited based on the particular resemblance in the present invention.

Namely, the candidate number is changed so that the candidate number corresponding to the threshold value becomes the maximum and the candidate number is decreased as the resemblance is changed from the threshold value to the highest value (in the case where the agreement is attained). In this manner, it becomes possible to perform the authentication processing with a substantially increased speed while maintaining the level of precision with which the candidate selection is made.

Further, in the above-described embodiment, the case where the center of the feature block in reference to the vein image is used as the feature position information which is associated with the vein image for registration has been discussed. However, without being limited to the embodiment, the position of part of the border of the feature block such as the upper left end and the lower right end and/or the midway of the upper end and the midway of the lower end of the particular feature block may be used, and/or a position having a constant bearing on the center may be used in the present invention. In effect, any position defined on the feature block can be adopted as the object to be registered. The same can be said in the case where a living-body image other than the vein image is used.

Further, in the above-described embodiment, the case where the authentication device 1 having an imaging function, a registration function, and an authentication function is applied has been discussed. However, without being limited to the embodiment, mode of dividing the device into separate devices for each of the functions and/or distributing part of the functions to separate devices is used for the particular use in the present invention.

INDUSTRIAL APPLICABILITY

The present invention can be used in the field of detecting and/or managing a predetermined person, for example.

The invention claimed is:

1. A registering device comprising:
an imaging device that acquires a living-body image;
a processor; and
a memory coupled to the processor;
wherein the processor is configured to include
a detecting unit that detects a feature area used in an authentication process of the living-body image, and
a registering unit that associates position information indicating a position of part of the feature area with respect to a reference with living-body information relating to a living body shown in the living-body image and that registers the position information and the living-body information with the memory,
wherein the living-body image includes a vein image, and
wherein the detecting unit divides the vein image into a plurality of blocks and detects a single block which becomes the feature area from each of the divided blocks based on a number of pixels and a number of diverging points of a vein constituting the block.

2. The registering device according to claim 1, wherein the detecting unit divides the vein image into a plurality of blocks sharing a common element in part.

3. The registering device according to claim 1, wherein the detecting unit detects a single block which becomes the feature area from each of the divided blocks based on the number of the pixels of the vein constituting the block and a result of assigning a weight to the number of the diverging points of the vein constituting the block.

4. The registering device according to claim 1, wherein the detecting unit detects a single block which becomes the feature area from each of the divided blocks based on a sum of the number of the pixels of the vein constituting the block in reference to a total number of pixels of a vein constituting an entire image and the number of the diverging points of the vein constituting the block in reference to a total number of diverging points of a vein constituting the entire vein image.

5. The registering device according to claim 1, wherein the registering unit associates position information indicating a position of a center of a single block with respect to a reference with the living-body information and registers the position information and the living-body information with the memory.

6. A registering method comprising:
acquiring a living-body image,
detecting a feature area to be used in an authentication process from the living-body image,
associating position information indicating a position of the feature area with respect to a reference with living-body information indicating a living body shown in the living-body image, and
registering the position information and the living-body information with a memory,
wherein the living-body image includes a vein image, and
wherein the detecting includes dividing the vein image into a plurality of blocks and detecting a single block which becomes the feature area from each of the divided blocks based on a number of pixels and a number of diverging points of a vein constituting the block.

7. An authentication device comprising:
an imaging device that acquires a living-body image for authentication;
a processor; and
a memory coupled to the processor;
wherein the processor is configured to include
a detecting unit that detects a feature area of the living-body image for authentication,
a selecting unit that cuts out an area from each of a plurality of living-body information items registered with the memory based on position information associated with the living-body information item and that selects a candidate for verification from the plurality of living-body information items based on a resemblance between each of the cut-out areas and the feature area, and
a determining unit that determines whether or not the living-body image is a registered person based on a verification result of comparing the selected candidate for verification against the feature area of the living-body image for authentication,
wherein the living-body image includes a vein image, and
wherein the detecting unit divides the vein image into a plurality of blocks and detects a single block which becomes the feature area from each of the divided blocks based on a number of pixels and a number of diverging points of a vein constituting the block.

8. The authentication device according to claim 7, wherein the detecting unit divides a center area of the vein image into a plurality of blocks.

9. The authentication device according to claim 8, wherein the detecting unit divides the center area into a plurality of blocks sharing a common element in part.

10. The authentication device according to claim 7, wherein the detecting unit detects a single block which becomes the feature area from each of the divided blocks based on the number of the pixels of the vein constituting the block and a result of assigning a weight to the number of the diverging points of the vein constituting the block.

11. The authentication device according to claim 7, wherein the detecting unit detects a single block which becomes the feature area from each of the divided blocks based on a sum of the number of the pixels of the vein constituting the block in reference to a total number of pixels of a vein constituting an entire image and the number of the diverging points of the vein constituting the block in reference to a total number of diverging points of a vein constituting the entire vein image.

12. The authentication device according to claim 7, wherein the selecting unit determines a number of a candidate for verification against the living-body image for authentication based on the resemblance.

13. An authentication method comprising:
acquiring a living-body image for authentication,
detecting a feature area of the living-body image for authentication,
cutting out an area from each of a plurality of living-body information items registered with a memory based on position information associated with the living-body information item,
selecting a candidate for verification from the plurality of living-body information items based on a resemblance between each of the cut-out areas and the feature area, and
determining whether or not the living body image is a registered person based on a verification result of comparing the selected candidate for verification against the feature area of the living-body image for authentication,
wherein the living-body image includes a vein image, and
wherein the detecting includes dividing the vein image into a plurality of blocks and detecting a single block which becomes the feature area from each of the divided blocks based on a number of pixels and a number of diverging points of a vein constituting the block.

* * * * *